(12) United States Patent
Takahashi et al.

(10) Patent No.: US 6,975,499 B2
(45) Date of Patent: Dec. 13, 2005

(54) VACUUM VARIABLE CAPACITOR WITH ENERGIZATION AND HEAT SHIELDING BELLOWS

(75) Inventors: Eiichi Takahashi, Shizuoka (JP); Toshimasa Fukai, Shizuoka (JP); Naoki Hayashi, Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 11/017,222

(22) Filed: Dec. 21, 2004

(65) Prior Publication Data

US 2005/0162807 A1 Jul. 28, 2005

(30) Foreign Application Priority Data

Dec. 22, 2003 (JP) ............................. 2003-425811

(51) Int. Cl.[7] .............................................. H01G 5/00
(52) U.S. Cl. ...................... 361/277; 361/278; 361/279; 361/282; 361/297
(58) Field of Search ................................ 361/277–279, 361/271, 292, 283.1, 291, 293, 296–297, 361/298.2, 300; 417/222.2; 251/129.02

(56) References Cited

U.S. PATENT DOCUMENTS

| 3,270,259 A | | 8/1966 | Oeschger |
| 3,551,735 A | * | 12/1970 | Staats .......................... 315/39.3 |
| 4,860,160 A | * | 8/1989 | Boksberger et al. ......... 361/279 |
| 6,268,995 B1 | | 7/2001 | Beuerman et al. |
| 6,307,729 B1 | * | 10/2001 | Fukai et al. ................. 361/303 |

FOREIGN PATENT DOCUMENTS

| JP | 7-078729 A | 3/1995 |
| JP | 8-097088 A | 4/1996 |
| JP | 2001-217147 A | 8/2001 |

* cited by examiner

Primary Examiner—Anthony Dinkins
(74) Attorney, Agent, or Firm—Foley & Lardner LLP

(57) ABSTRACT

A vacuum variable capacitor includes an energization bellows arranged in a vacuum vessel and having ends mounted to a movable-electrode support plate and a movable side-end plate, respectively, a heat shielding bellows arranged inside the energization bellows and outside a slide-guide support and having ends mounted to the movable-electrode support plate and the movable side-end plate, respectively, and a cooling pipe interposed between the two bellows and for preventing transfer of heat generated in the energization bellows.

12 Claims, 3 Drawing Sheets

VACUUM VARIABLE CAPACITOR WITH ENERGIZATION AND HEAT SHIELDING BELLOWS

BACKGROUND OF THE INVENTION

The present invention relates to a vacuum variable capacitor for various circuits such as an oscillating circuit of a super power oscillator, an RF power circuit, and a tank circuit of an induction heating apparatus, and more particularly, to the vacuum variable capacitor with energization and heat shielding bellows.

Vacuum capacitors are broadly divided into a vacuum fixed capacitor wherein a capacitance value is fixed and a vacuum variable capacitor wherein a capacitance value can be varied.

The characteristics required of the vacuum variable capacitor are lower power loss, less heat generation during energization, longer life, etc. As will be described hereinafter in detail, the vacuum variable capacitor comprises an adjustment screw, the temperature of which becomes very high (up to about 300° C. by estimate) due to convection/radiation from the air side of a bellows as a heat generation source and heat conduction from the bellows, electrodes, center pin as heat generation sources through a movable-electrode support plate and a movable lead. A reduction in internal heat generation of the vacuum variable capacitor and in conduction of this generated heat to the adjustment screw is an important factor involved in increasing the life of the vacuum variable capacitor.

SUMMARY OF THE INVENTION

With the typical vacuum variable capacitor, the temperature of the adjustment screw and its surroundings becomes very high due to convection/radiation from the bellows as a heat generation source and heat conduction from the bellows, electrodes, center pin as heat generation sources through the movable-electrode support plate and movable lead. Moreover, the vacuum variable capacitor is not constructed to release internally generated heat to outside, heat stays inside, interfering with a temperature reduction of the heat generation sources. A solution for achieving a temperature reduction of the adjustment screw is arrangement of a heat pipe to prevent the convection/radiation. However, this solution does not produce an effect that was intended. As a result, as the temperature of the surroundings of the adjustment screw becomes higher, a sliding agent such as grease placed thereon is volatilized, causing intense wear of the adjustment screw, leading to reduced life of the vacuum variable capacitor. Moreover, with a rise in the temperature of the slide portion, the slide-ability of the slide portion is degraded due to thermal expansion, thermal stress, etc. occurring therein.

Typically, a reduction in heat generation of the heat generation sources and thus in power loss of the vacuum variable capacitor is achieved only by designing the bellows to have larger diameter. And no sufficient consideration is given to structural improvement for preventing heat generated in the heat generation sources from being transmitted to the parts affecting the life of the adjustment screw, etc. Moreover, no sufficient consideration is given to structural improvement for releasing internally generated heat to outside. It is noted the typical vacuum variable capacitor is not operated with heavy current, a reduction in heat generation of the heat generation sources can be achieved only by increasing the diameter of the bellows.

It is, therefore, an object of the present invention to provide a vacuum variable capacitor which allows a reduction in inside temperature of the vacuum variable capacitor and an enhancement in energization ability and life thereof.

Generally, the present invention provides a vacuum variable capacitor, which comprises: a vacuum vessel, the vacuum vessel comprising an insulating tube and stationary and movable side-end plates mounted to respective ends of the insulating tube; a movable-electrode support plate arranged in the vacuum vessel, the movable-electrode support plate facing the stationary side-end plate; stationary and movable electrodes oppositely arranged on the stationary side-end plate and the movable-electrode support plate, respectively; a slide shaft having a first end mounted to the movable-electrode support plate and a second end arranged through the movable side-end plate and connected to an operation mechanism; a slide guide having the slide shaft slidably arranged therethrough; an energization bellows arranged in the vacuum vessel, the energization bellows having ends mounted to the movable-electrode support plate and the movable side-end plate, respectively; a slide-guide support arranged inside the energization bellows, the slide-guide support being mounted to the movable side-end plate, the slide-guide support supporting the slide guide; a heat shielding bellows arranged inside the energization bellows and outside the slide-guide support, the heat shielding bellows having ends mounted to the movable-electrode support plate and the movable side-end plate, respectively; and a device interposed between the two bellows, the device preventing transfer of heat generated in the energization bellows.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
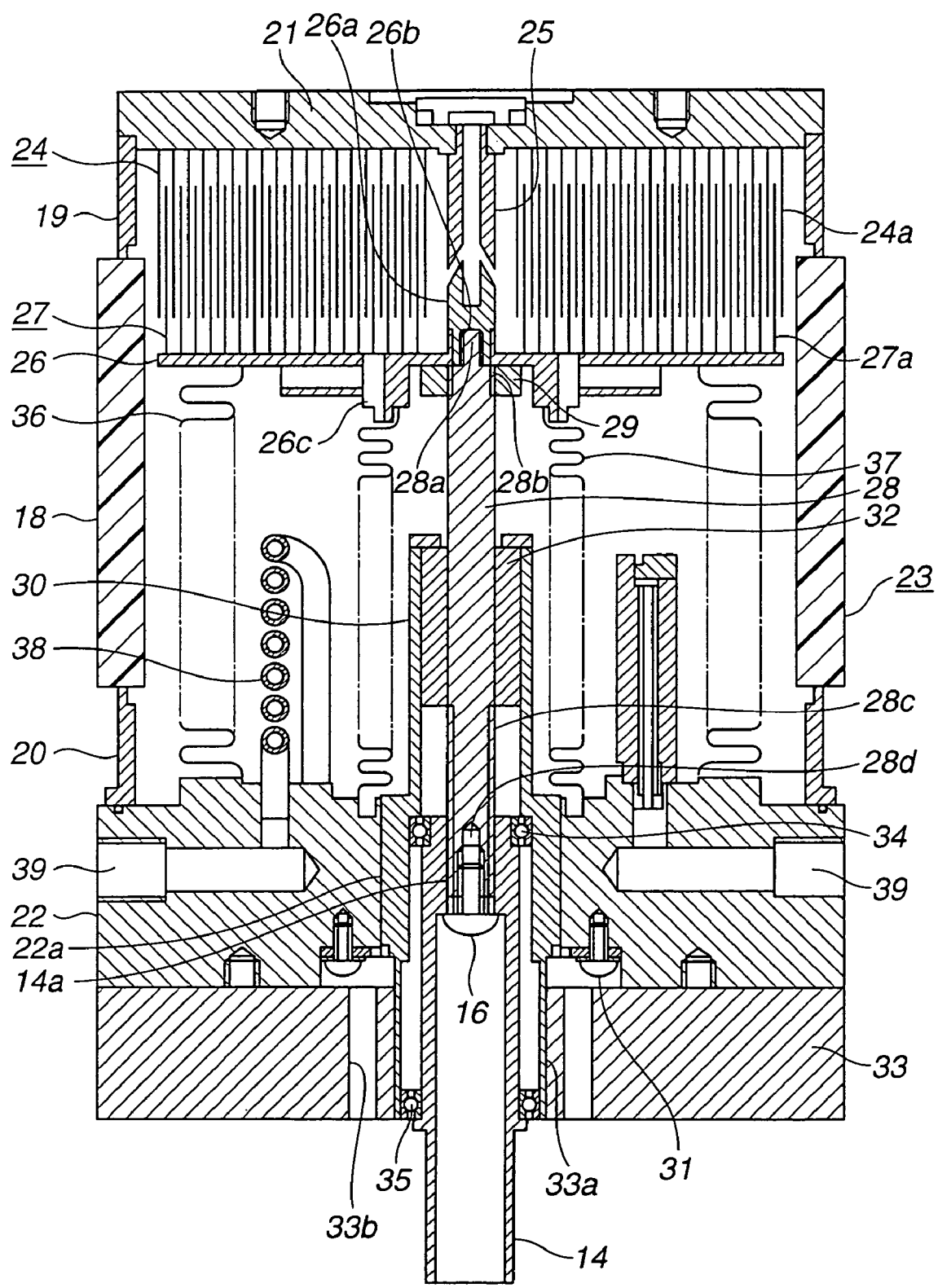
FIG. 1 is a longitudinal sectional view showing a first embodiment of a vacuum variable capacitor according to the present invention.

Referring to the drawings, a description will be made about preferred embodiments of a vacuum variable capacitor according to the present invention.

Figure 3:
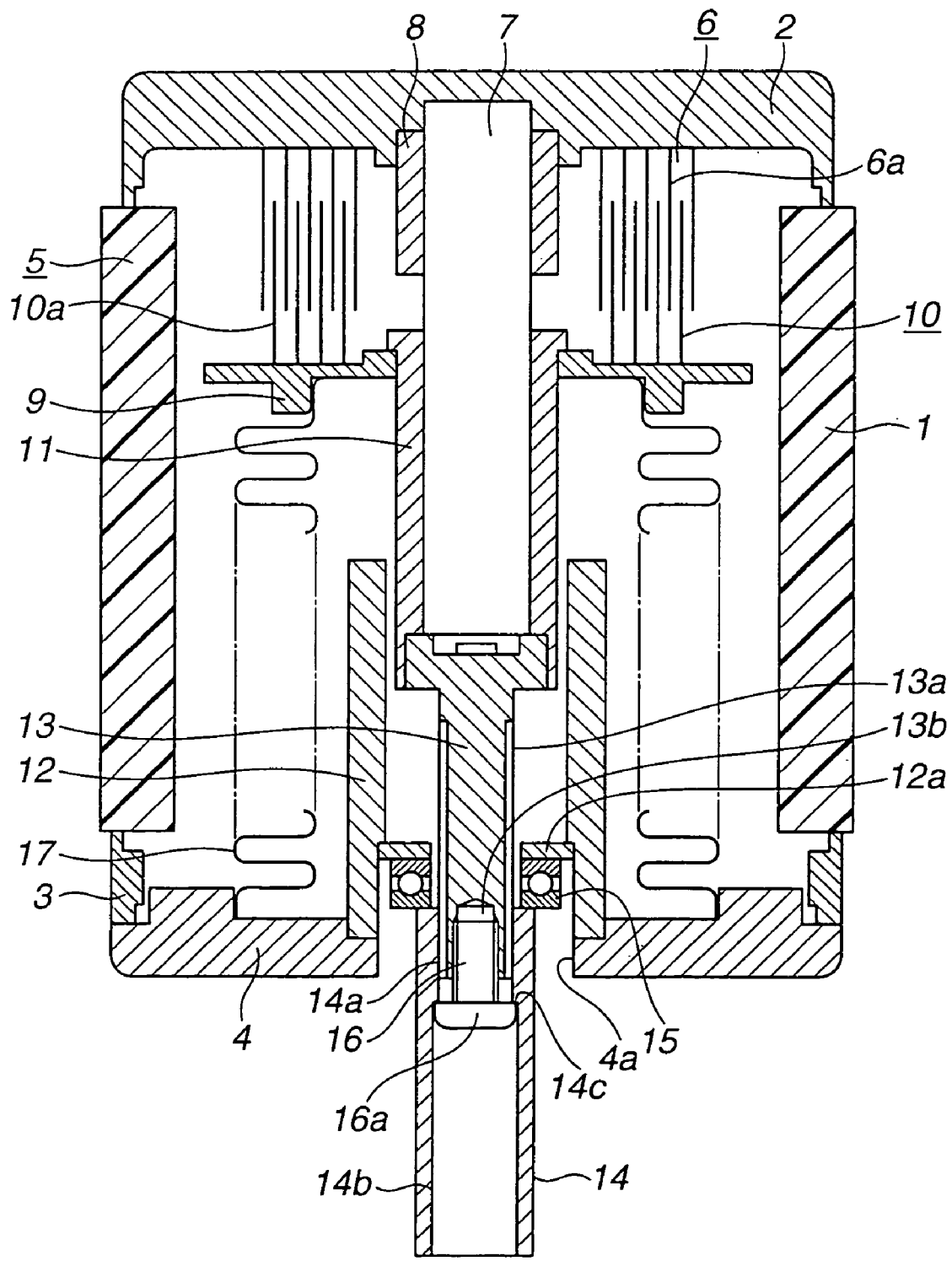
FIG. 3 is a view similar to FIG. 3, showing a typical vacuum variable capacitor.

Referring to FIG. 3, before describing the preferred embodiments of the present invention, the structure of the typical vacuum variable capacitor will be described in detail. The vacuum variable capacitor comprises a ceramic insulating tube 1, a stationary side-end plate 2 secured to a first end of the insulating tube 1, and a movable side-end plate 4 secured to a second end of the insulating tube 1 through a connecting tube 3, thus forming a vacuum vessel 5.

A stationary electrode 6 is comprised of a plurality of cylindrical electrode plates 6a with different diameters mounted concentrically to the inner surface of the stationary side-end plate 2. A center pin 7 is arranged in the center of the inner surface of the stationary side-end plate 2 through a stationary guide 8. A movable-plate support plate 9 is disposed in the vacuum vessel 5 to face the stationary side-end plate 2. A movable electrode 10 is comprised of a plurality of cylindrical electrode plates 10 with different diameters mounted concentrically to the movable-plate support plate 9 in such a way as to allow non-contact engagement and disengagement between the electrode plates 6a of the stationary-side electrode 6.

A cylindrical movable lead 11 is arranged through the center of the movable-electrode support plate 9 for integration therewith. The movable lead 11 is electrically isolated from the center pin 7. A hole 4a is formed in the center of the movable side-end plate 4. A heat pipe 12 is arranged at the perimeter of the hole 4a and on the inner surface of the movable side-end plate 4. A flange 12a is provided to the inner surface of the heat pipe 12 to protrude inward. An adjustment screw 13 with an external thread 13a at the outer periphery has a first end engaged with the movable lead 11 and a second end arranged through the flange 12a of the heat pipe 12. An adjustment nut 14 constituting an operation mechanism has a first end which is formed at the inner periphery with an internal thread 14a meshed with the external thread 13a of the adjustment screw 13, and is rotatably supported by the underside of the flange 12a through a bearing 15.

The adjustment screw 13 has a second end formed with an internal thread 13b with which a stop screw 16 is meshed. The adjustment nut 14 also has a hole 14b formed to continuously extend from the internal thread 14a and has larger diameter than a section of the internal thread 14a. A step 14c is arranged between the internal thread 14a and the hole 14b. A cylindrical bellows 17 is arranged at the outer periphery of the movable lead 11 and the heat pipe 12 to separate the vacuum side and the atmospheric side. The bellows 17 has a first end mounted to the movable-electrode support plate 9 and a second end mounted to the movable side-end plate 4, thus maintaining the inside of the vacuum vessel 5 under vacuum.

When adjusting a maximum capacitance value of the vacuum capacitor, the adjustment screw 14 is slightly turned to the right (in the case that the screw 14 is a right-hand screw) before engaging the stop screw 16. Thus, the movable lead 11 is slightly moved downward with respect to the position of maximum capacitance value where a distal end of the center pin 7 abuts on an inner end of the adjustment screw 13, then achieving adjustment of a defined maximum capacitance value. This slight adjustment amount is determined to correspond to a variation in capacitance of the vacuum capacitor.

Then, the stop screw 16 is meshed with the internal thread 13b of the adjustment screw 13 until a head 16a abuts on the step 14c of the adjustment nut 14. The stop screw 16 is fixed to the adjustment screw 13 by an adhesive and the like. The stop screw 16 and the adjustment nut 14 are not bonded to each other. This restrains an upward position of the adjustment screw 13, so that even when trying to turn the adjustment nut 14 to the left with respect to the position of maximum capacitance value, its turning cannot be obtained due to the head 16a of the stop screw 16 abutting on the step 14c of the adjustment nut 14, obtaining no upward movement of the adjustment screw 13. The capacitance is adjusted by changing the gross facing area of the movable electrode 10 with respect to the stationary electrode 6 by moving the movable electrode 10 vertically. Vertical movement of the movable electrode 10 is achieved such that when turning the adjustment nut 14 to the right, the adjustment screw 13 is moved downward, whereas when turning it to the left, the adjustment screw 13 is moved upward.

With the vacuum variable capacitor, since the vacuum vessel 5 is maintained under vacuum therein, the adjustment screw 13 always undergoes an upward pushing force, which also acts on the adjustment nut 14, producing the surface pressure at the flange 12a, leading to great torque required for rotation of the adjustment nut 14. In the illustrative embodiment, arrangement of the bearing 15 allows a reduction in such torque.

As described hereinbefore, the characteristics required of the vacuum variable capacitor are lower power loss, less heat generation during energization, longer life, etc. The vacuum variable capacitor comprises adjustment screw 13, the temperature of which becomes very high (up to about 300° C. by estimate) due to convection/radiation from the air side of the bellows 17 as a heat generation source and heat conduction from the bellows 17, electrodes 6, 10, center pin 7 as heat generation sources through the movable-electrode support plate 9 and the movable lead 11. A reduction in internal heat generation of the vacuum variable capacitor and in conduction of this generated heat to the adjustment screw 13 is an important factor involved in increasing the life of the vacuum variable capacitor.

Referring to FIG. 1, there is shown first embodiment of the present invention. The vacuum variable capacitor comprises an insulating tube 18 and a stationary side-end plate 21 and movable side-end plate 22 connected to ends of the stationary side-end plate 18 through connecting tubes 19, 20, thus forming a vacuum vessel 23. A cooling flange 33 is mounted to the underside of the stationary side-end plate 22. The cooling flange 33 has an engagement hole 33a formed in the center and an air hole 33b formed therethrough. A stationary electrode 24 is comprised of a plurality of cylindrical electrode plates 24a with different diameters mounted concentrically to the inner surface of the stationary side-end plate 21. A cylindrical electrode guide 25 has a first end arranged in the center of the inner surface of the stationary side-end plate 21 and a second end shaped like an inverted cone. A movable-electrode support plate 26 is disposed in the vacuum vessel 23 to face the stationary side-end plate 21. A movable electrode 27 is comprised of a plurality of cylindrical electrode plates 27a with different diameters mounted concentrically to the movable-electrode support plate 26 in such a way as to allow non-contact engagement and disengagement between the electrode plates 24a of the stationary electrode 24.

Moreover, the movable-electrode support plate 26 has in the center a protrusion 26a having a conical distal end and formed to face the electrode guide 25 and an internal thread 26b. A slide shaft 28 has a first end formed with small-diameter and large-diameter external threads 28a, 28b, wherein the small-diameter external thread 28a is meshed with the internal thread 26b of the movable-electrode support plate 26, and the large-diameter external thread 28b meshed with a setscrew 29. The small-diameter external thread 28a has 0.70 pitch, whereas the large-diameter external thread 28b has 1.25 pitch. A combination of the two threads 28a, 28b of different pitches provides a double-nut system so called, achieving prevention of disengagement of the threads. The first end of the slide shaft 28 and the movable-electrode support plate 26 are connected by a mechanical structure, and not by brazing. The electrode guide 25 abuts on the protrusion 26a of the movable-electrode support plate 26 to prevent the stationary and movable electrodes 24, 27 from totally overlapping each other.

The movable side-end plate 22 has in the center a hole 22a in which a cylindrical heat pipe 30 is engaged. The heat pipe 30 is fixed to the movable side-end plate 22 by a screw 31. The material of the heat pipe 30 is copper, SUS, or the like.

The slide shaft 28 is arranged through the heat pipe 30. A cylindrical slide guide 32 is arranged between the heat pipe 30 and the slide shaft 28. The heat pipe 30 serves to support the slide guide 32. The slide shaft 28 is slidably arranged through the slide guide 32 to constitute a slide portion, sliding of which allows the movable-electrode support plate 26 to move parallel to the center line of the vacuum vessel 23. The material of the slide guide 32 is copper or SUS. The slide guide 32 includes a direct acting linear bushing. The heat pipe 30 extends outside the vacuum vessel 23 to engage in the engagement hole 33a of the cooling flange 33. A second end of the slide shaft 28 is inserted in the heat pipe 30, and has an external thread 28c formed at the outer periphery and an internal thread 28d formed at the inner periphery.

An adjustment nut 14 and a stop screw 16 are the same as used in the typical vacuum variable capacitor. The adjustment nut 14 constituting part of an operation mechanism has an internal thread 14a meshed with the external thread 28c of the slide shaft 28, and the stop screw 16 is meshed with the internal thread 28c of the slide shaft 28. A plurality of bearings 34, 35 are interposed between the heat pipe 30 and the adjustment nut 14. This prevents inclination of the adjustment nut 14 and allows enhancement in proof stress to a lateral load on the adjustment nut 14.

The stop screw 16 has a head 16a meshed with the internal thread 28d of the slide shaft 28 in the same way as in the typical vacuum variable capacitor, determining a position of maximum capacitance value. In the position of maximum capacitance value, even when trying to turn the adjustment nut 14 to the left, its turning cannot be obtained due to the head 16a of the stop screw 16 abutting on a step 14c of the adjustment nut 14. The capacitance is adjusted by moving the movable electrode 27 vertically. Specifically, the adjustment nut 14 is turned to move the slide shaft 28 vertically so as to cause vertical movement of the movable electrode 27 through the movable-electrode support plate 26 mounted to the slide shaft 28.

Arranged in the vacuum vessel 23 are a cylindrical energization bellows 36 having ends mounted to the movable-electrode support plate 26 and the movable side-end plate 22 and a cylindrical heat shielding bellows 37 arranged between the energization bellows 36 and the heat pipe 30, adjustment nut 14, slide guide 32 and slide shaft 28 to prevent heat convection/heat radiation from the energization bellows 36 to the slide portion. The inside of each bellows 36, 37 is sealed with respect to the outside. Ends of the heat shielding bellows 37 are also mounted to the movable-electrode support plate 26 and the movable side-end plate 22. A cooling pipe 38 located between the energization bellows 36 and the heat shielding bellows 37 is mounted to the movable side-end plate 22. The movable side-end plate 22 is formed with a communication hole 39 to provide fluid communication between the cooling pipe 38 and the outside. A cooling medium such as water or air is fed to the cooling pipe 38 to cool down the energization bellows 36, releasing heat generated therein. Optionally, a plurality of cooling pipes 38 may be adopted. Heat generated in the electrodes 24, 27 as heat generation sources is released from the stationary side-end plate 21. In order to obtain further release of heat of the electrodes 24, 27 to outside, a hole 26c is formed in the movable-electrode support plate 26 between the two bellows 36, 37 to release heat of the electrodes 24, 27, which is removed through the cooling pipe 38.

As described above, the heat pipe 30 concealing the slide guide 32 and the adjustment nut 14 is arranged through the movable side-end plate 22 to extend downward, engaging in the engagement hole 33a of the cooling flange 33. The cooling flange 33 is cooled down with a cooling medium such as water or air, which also provides cooling of the heat pipe 30. Due to heat conduction, cooling the heat pipe 30 allows the slide portion to be cooled down. The cooling flange 33 is formed with an air hole 33b for releasing heat generated in the slide portion to outside. The slide shaft 28 is mechanically connected to the movable-electrode support plate 26 to reduce a coefficient of heat transfer from the movable-electrode support plate 26. Moreover, the use of the members of enhanced screw hardness such as setscrew 29 allows increasing the life of the vacuum variable capacitor.

In the first embodiment, the heat shielding bellows 37 is interposed between the energization bellows 36 and the heat pipe 30 serving as a slide-guide support, preventing heat convection/heat radiation from the energization bellows 36 to be applied to the slide portion during energization of the vacuum variable capacitor, resulting in enhancement in energization ability and life thereof. Further, the cooling pipe 38 having a cooling medium fed from outside is interposed between the two bellows 36, 37, allowing release of heat generated in the energization bellows 36 to outside, resulting in enhancement in energization ability and life of the vacuum variable capacitor due to reduction in inside temperature thereof. Furthermore, cooling is carried out through the cooling pipe 38, and not with cooling water, allowing prevention of occurrence of a bad influence on expansion/contraction of the bellows 36, 37 and corrosion thereof.

Further, since the hole 26c is formed in the movable-electrode support plate 26 between the two bellows 36, 37, heat generated in the electrodes 24, 27 can be released from the hole 26c and removed to outside through the cooling pipe 38, resulting in enhancement in energization ability and life of the vacuum variable capacitor due to reduced inside temperature thereof. Moreover, the heat pipe 30 concealing the slide shaft 28, the slide guide 32, etc. has a portion extending outside the vacuum vessel 23, which is cooled down with a cooling medium through the cooling flange 33, and the air hole 33b is formed in the cooling flange 33 to release heat of the heat pipe 30 to outside, allowing cooling of the slide shaft 28, etc. by heat conduction, resulting in increasing the life of the vacuum variable capacitor.

Still further, the movable-electrode support plate 26 and the slide shaft 28 are connected by a mechanical structure, and not by brazing, achieving a reduction in coefficient of heat transfer from the movable-electrode support plate 26, allowing reduced temperature of the slide shaft 28 and thus increased life of the vacuum variable capacitor. Moreover, due to its small diameter, the heat shielding bellows 37 has a small self-closing force resulting from a differential between the internal pressure and a vacuum, allowing a reduction in axial load of the adjustment nut 14 and thus in surface pressure of the internal thread 14a of the adjustment nut 14, resulting in increasing the life of the vacuum variable capacitor. This also allows a reduction in torque of the adjustment nut 14, achieving a reduction in output of a drive such as motor, resulting in downsizing the drive.

Figure 2:
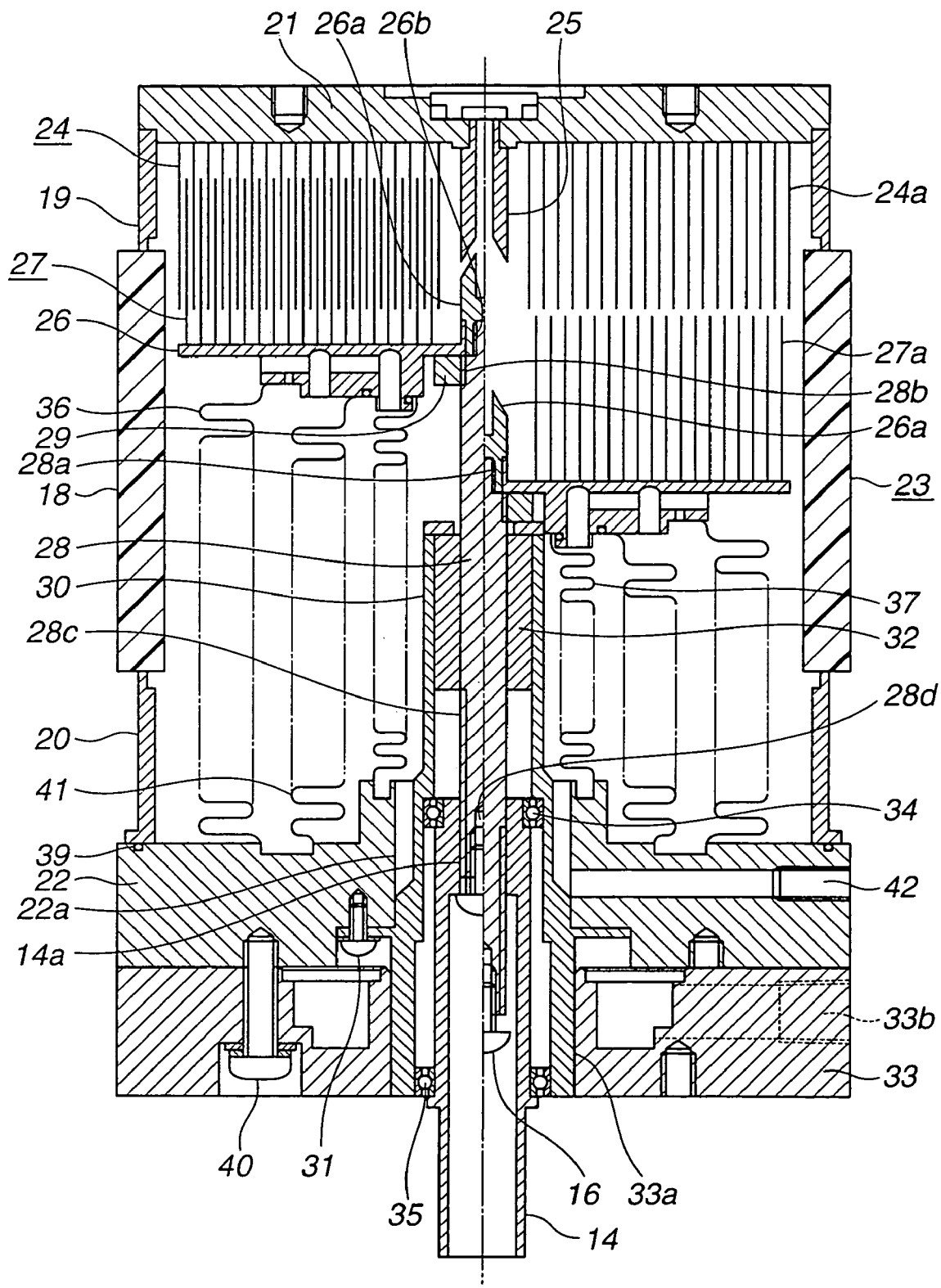
FIG. 2 is a view similar to FIG. 1, showing a second embodiment of the present invention.

Referring to FIG. 2, there is shown second embodiment of the present invention. The cooling flange 33 is mounted to the underside of the stationary side-end plate 22 by a bolt 40. The cooling flange 33 has engagement hole 33a formed in the center and air hole 33b formed therein. A cylindrical heat shielding bellows 41 having ends mounted to the movable-electrode support plate 26 and the movable side-end plate 22 is interposed between the energization bellows 36 and the heat shielding bellows 37. The inside of each bellows 36, 37, 41 is sealed with respect to the outside. An air hole 42 is formed in the movable side-end plate 22 to provide fluid communication between the inside of the innermost heat shielding bellows 37, i.e. the air side of the vacuum vessel 23 and the outside. Air is fed to the air hole 42 to remove to outside heat staying inside the vacuum vessel 23. Other structures of the second embodiment are the same as those of the first embodiment.

In the second embodiment, the two heat shielding bellows 37, 41 are interposed between the energization bellows 36 and the heat pipe 30 serving as a slide-guide support, preventing heat convection/heat radiation from the energization bellows 36 to be applied to the slide portion during energization of the vacuum variable capacitor, resulting in enhancement in energization ability and life thereof. Further, the air hole 42 is formed to provide fluid communication between the inside of the heat shielding bellows 37, i.e. the air side of the vacuum vessel 23 and the outside, removing to outside heat staying inside the vacuum vessel 23, resulting in enhancement in energization ability and life of the vacuum variable capacitor due to reduction in inside temperature thereof. Other effects of the first embodiment are the same as those of the first embodiment.

In the third embodiment, in order to provide an energization ability to the heat shielding bellows 37 shown in FIG. 1, the heat shielding bellows 37 is formed of a material having high electric conductivity such as copper-plated SUS, SUS-Ag alloy, copper, copper alloy, or the like. Feed current is diverted to the bellows 36, 37, allowing enhancement in energization ability of the vacuum variable capacitor due to energization ability of the bellows 37 and restraint in heat generation thereof, resulting in reducing the temperature of the slide portion and thus increasing the life of the vacuum variable capacitor. Other structures and effects of the third embodiment are the same as those of the first embodiment.

In the fourth embodiment, in order to provide an energization ability to the heat shielding bellows 37, 41 shown in FIG. 2, the heat shielding bellows 37, 41 are formed of a material having high electric conductivity such as copper-plated SUS, SUS-Ag alloy, copper, copper alloy, or the like. Feed current is diverted to the bellows 36, 37, 41, allowing further enhancement in energization ability of the vacuum variable capacitor due to energization ability of the bellows 37, 41 and restraint in heat generation thereof, resulting in further reducing the temperature of the slide portion and thus further increasing the life of the vacuum variable capacitor. Other structures and effects of the third embodiment are the same as those of the second embodiment.

As described above, according to the present invention, the heat shielding bellows is interposed between the energization bellows and the heat pipe serving as a slide-guide support, preventing heat convection/heat radiation from the energization bellows to be applied to the slide portion during energization of the vacuum variable capacitor, resulting in enhancement in energization ability and life thereof. Further, the cooling pipe having a cooling medium fed from outside is interposed between the two bellows, allowing release of heat generated in the energization bellows to outside, resulting in enhancement in energization ability and life of the vacuum variable capacitor due to reduction in inside temperature thereof. Furthermore, cooling is carried out through the cooling pipe, and not with cooling water, allowing prevention of occurrence of a bad influence on expansion/contraction of the two bellows and corrosion thereof. Moreover, due to its small diameter, the heat shielding bellows has a small self-closing force resulting from a differential between the internal pressure and a vacuum, allowing a reduction in axial load of the adjustment nut, resulting in increasing the life of the vacuum variable capacitor. This also allows a reduction in torque of the adjustment nut, achieving a reduction in output of a drive such as motor, resulting in downsizing the drive.

Further, according to the present invention, the two heat shielding bellows are interposed between the energization bellows and the slide-guide support, preventing heat convection/heat radiation due to heat generation in the energization bellows to be applied to the slide portion, achieving further reduction in temperature of the slide portion, resulting in enhancement in energization ability and life of the vacuum variable capacitor. Moreover, due to its small diameter, the inside heat shielding bellows has a small self-closing force resulting from a differential between the internal pressure and a vacuum, allowing a reduction in axial load of the adjustment nut, resulting in increasing the life of the vacuum variable capacitor. This also allows a reduction in torque of the adjustment nut, achieving a reduction in output of a drive such as motor, resulting in downsizing the drive.

Still further, according to the present invention, the air hole is formed to provide fluid communication between the air side of the vacuum vessel and the outside, removing to outside heat staying inside the vacuum vessel, resulting in enhancement in energization ability and life of the vacuum variable capacitor due to reduction in inside temperature thereof.

Still further, according to the present invention, since the hole is formed in the movable-electrode support plate between the two bellows, heat generated in the electrodes can be released to outside through the hole and the cooling pipe, resulting in enhancement in energization ability and life of the vacuum variable capacitor due to reduced inside temperature thereof.

Furthermore, according to the present invention, the slide-guide support has a portion extending outside the vacuum vessel, which is cooled down with a cooling medium, allowing cooling of the slide portion by heat conduction, resulting in increasing the life of the vacuum variable capacitor.

Further, according to the present invention, the slide shaft and the movable-electrode support plate are connected by a mechanical structure, and not by brazing, achieving a reduction in coefficient of heat transfer from the movable-electrode support plate, allowing reduced heat conduction to the slide portion and thus increased life of the vacuum variable capacitor.

Furthermore, according to the present invention, since the heat shielding bellows also has an energization ability, feed current is diverted to the energization and heat shielding bellows, allowing enhancement in energization ability of the vacuum variable capacitor due to energization ability of the heat shielding bellows and restraint in heat generation thereof, resulting in further reducing the temperature of the slide portion and thus further increasing the life of the vacuum variable capacitor. When arranging a plurality of heat shielding bellows, feed current is diverted to the three or more bellows, allowing enhancement in energization ability of the vacuum variable capacitor and further restraint in heat generation, resulting in further reducing the temperature of the slide portion and thus further increasing the life of the vacuum variable capacitor.

Having described the present invention in connection with the preferred embodiments, it is noted that the present invention is not limited thereto, and various changes and modifications can be made without departing from the scope of the present invention.

The entire teachings of Japanese Patent Application P2003-425811 filed Dec. 22, 2003 are hereby incorporated by reference.

What is claimed is:

1. A vacuum variable capacitor, comprising:
    a vacuum vessel, the vacuum vessel comprising an insulating tube and stationary and movable side-end plates mounted to respective ends of the insulating tube;
    a movable-electrode support plate arranged in the vacuum vessel, the movable-electrode support plate facing the stationary side-end plate;
    stationary and movable electrodes oppositely arranged on the stationary side-end plate and the movable-electrode support plate, respectively;
    a slide shaft having a first end mounted to the movable-electrode support plate and a second end arranged through the movable side-end plate and connected to an operation mechanism;
    a slide guide having the slide shaft slidably arranged therethrough;
    energization bellows arranged in the vacuum vessel, the energization bellows having ends mounted to the movable-electrode support plate and the movable side-end plate, respectively;
    a slide-guide support arranged inside the energization bellows, the slide-guide support being mounted to the movable side-end plate, the slide-guide support supporting the slide guide;
    heat shielding bellows arranged inside the energization bellows and outside the slide-guide support, the heat shielding bellows having ends mounted to the movable-electrode support plate and the movable side-end plate, respectively; and
    a device interposed between the two bellows, the device preventing transfer of heat generated in the energization bellows.

2. The vacuum variable capacitor as claimed in claim 1, wherein the device comprises a cooling pipe mounted to the movable side-end plate, the cooling pipe having a cooling medium fed from outside.

3. The vacuum variable capacitor as claimed in claim 1, wherein the device comprises another heat shielding bellows having ends mounted to the movable-electrode support plate and the movable side-end plate.

4. The vacuum variable capacitor as claimed in claim 1, further comprising an air hole which provides fluid communication between the air side of the vacuum vessel and the outside.

5. The vacuum variable capacitor as claimed in claim 1, wherein the movable-electrode support plate is formed with a hole, the hole being located between the two bellows.

6. The vacuum variable capacitor as claimed in claim 2, wherein the slide-guide support includes a portion extending outside the vacuum vessel, the portion being cooled down with the cooling medium.

7. The vacuum variable capacitor as claimed in claim 1, further comprising a mechanical structure which provides connection between the slide shaft and the movable-electrode support plate.

8. The vacuum variable capacitor as claimed in claim 1, wherein the heat shielding bellows has an energization ability.

9. The vacuum variable capacitor as claimed in claim 3, wherein another heat shielding bellows has an energization ability.

10. A vacuum variable capacitor, comprising:
    a vacuum vessel, the vacuum vessel comprising an insulating tube and stationary and movable side-end plates mounted to respective ends of the insulating tube;
    a movable-electrode support plate arranged in the vacuum vessel, the movable-electrode support plate facing the stationary side-end plate;
    stationary and movable electrodes oppositely arranged on the stationary side-end plate and the movable-electrode support plate, respectively;
    a slide shaft having a first end mounted to the movable-electrode support plate and a second end arranged through the movable side-end plate and connected to an operation mechanism;
    a slide guide having the slide shaft slidably arranged therethrough;
    energization bellows arranged in the vacuum vessel, the energization bellows having ends mounted to the movable-electrode support plate and the movable side-end plate, respectively;
    a slide-guide support arranged inside the energization bellows, the slide-guide support being mounted to the movable side-end plate, the slide-guide support supporting the slide guide;
    heat shielding bellows arranged inside the energization bellows and outside the slide-guide support, the heat shielding bellows having ends mounted to the movable-electrode support plate and the movable side-end plate, respectively; and
    a cooling pipe interposed between the two bellows, the cooling pipe being mounted to the movable side-end plate, the cooling pipe having a cooling medium fed from outside.

11. A vacuum variable capacitor, comprising:
    a vacuum vessel, the vacuum vessel comprising an insulating tube and stationary and movable side-end plates mounted to respective ends of the insulating tube;
    a movable-electrode support plate arranged in the vacuum vessel, the movable-electrode support plate facing the stationary side-end plate;
    stationary and movable electrodes oppositely arranged on the stationary side-end plate and the movable-electrode support plate, respectively;
    a slide shaft having a first end mounted to the movable-electrode support plate and a second end arranged through the movable side-end plate and connected to an operation mechanism;
    a slide guide having the slide shaft slidably arranged therethrough;
    energization bellows arranged in the vacuum vessel, the energization bellows having ends mounted to the movable-electrode support plate and the movable side-end plate, respectively;
    a slide-guide support arranged inside the energization bellows, the slide-guide support being mounted to the movable side-end plate, the slide-guide support supporting the slide guide; and
    a plurality of heat shielding bellows arranged inside the energization bellows and outside the slide-guide support, each heat shielding bellows having ends mounted to the movable-electrode support plate and the movable side-end plate, respectively.

12. A vacuum variable capacitor, comprising:
- a vacuum vessel, the vacuum vessel comprising an insulating tube and stationary and movable side-end plates mounted to respective ends of the insulating tube;
- a movable-electrode support plate arranged in the vacuum vessel, the movable-electrode support plate facing the stationary side-end plate;
- stationary and movable electrodes oppositely arranged on the stationary side-end plate and the movable-electrode support plate, respectively;
- a slide shaft having a first end mounted to the movable-electrode support plate and a second end arranged through the movable side-end plate and connected to an operation mechanism;
- a slide guide having the slide shaft slidably arranged therethrough;
- energization bellows arranged in the vacuum vessel, the energization bellows having ends mounted to the movable-electrode support plate and the movable side-end plate, respectively;
- a slide-guide support arranged inside the energization bellows, the slide-guide support being mounted to the movable side-end plate, the slide-guide support supporting the slide guide;
- heat shielding bellows arranged inside the energization bellows and outside the slide-guide support, the heat shielding bellows having ends mounted to the movable-electrode support plate and the movable side-end plate, respectively; and
- means, interposed between the two bellows, for preventing transfer of heat generated in the energization bellows.

* * * * *